United States Patent Office 3,094,514
Patented June 18, 1963

3,094,514
POLYMERIZATION PROCESS FOR ALIPHATIC, CONJUGATED DIENES
Harold Tucker, Akron, Ohio, assignor to Goodrich-Gulf Chemicals, Inc., Cleveland, Ohio, a corporation of Delaware
No Drawing. Filed Feb. 13, 1958, Ser. No. 714,966
10 Claims. (Cl. 260—94.3)

The present invention relates to the preparation of soluble diolefin polymers having a high order of structural (stereoisomeric) regularity. More particularly, this invention relates to the polymerization of butadiene-1,3 hydrocarbons to produce soluble polymers low in gel content, high in molecular weight, high in 1,4 structure, and having good processability.

In copending applications, Serial No. 472,786, filed December 2, 1954, and Serial Nos. 503,027 and 503,028, filed April 21, 1955, there is disclosed a new process of polymerizing conjugated dienes. In such process, a catalyst made by reacting (1) an alkyl aluminum compound with (2) a heavy metal activator compound of the metals of the 4th to 10th positions of the long periods of the periodic arrangement of the elements in short and long periods, causes a conjugated aliphatic diene hydrocarbon containing a $CH_2=C<$group (such as isoprene or butadiene) to polymerize to a solid polymer in which substantially all of the diene hydrocarbon units are united 1,4. Such polymers include an all-cis-1,4 polyisoprene which has substantially the isomeric structure of natural hevea rubber; an all-trans-1,4 polyisoprene; and an all-trans-1,4 polybutadiene, both of which are predominantly resinous in character, somewhat resembling natural balata.

In copending applications, Serial No. 640,316, filed February 17, 1957, now abandoned and Serial No. 662,561, filed May 31, 1957, catalysts made by combining a cobalt salt with an alkyl aluminium compound are demonstrated as favoring the production of high cis-1,4 polybutadienes of exceptionally valuable properties.

In some of the above-mentioned processes, some measure of control over reaction rate and molecular weight can be obtained by varying the molar ratio heavy metal: aluminum and also, to a lesser extent, by varying the catalyst concentration and reaction temperature. However, these variables have relatively little effect on the micro-colloidal structure (i.e. gel structure) and physical state of aggregation of the polymer. To illustrate, in the cobalt/aluminum catalysts referred to above, catalysts made by dissolving $CoCl_2$ in isobutyl aluminum dichloride (a clear solution) are intensely active, often forming a solid mass of butadiene or isoprene polymer in a matter of minutes, even when the reaction mixture contains as much as 90–95% by volume of solvent or diluent. The resulting polymerization cannot be controlled in larger equipment because of agitation difficulties and the gelled masses obtained are most difficult to work up. Likewise, catalysts made by suspending $CoCl_2$ in diisobutyl aluminum chloride (a slurry-type cataylst) are also difficult to handle and control. Polymerization seems to proceed on the surface of the $CoCl_2$ particles causing the latter to swell, coalesce, and then settle out or become firmly affixed to the walls of the reactor. The polybutadienes produced by these catalysts are very high in cis-1,4 content and have low hysteresis values and excellent physical properties indicating potential value as a natural rubber replacement as a carcass rubber for use in large truck and bus tires. Before these new processes can be useful on a commercial scale, however, some means must be found for reducing the gelling tendency, eliminating cross-linking, increasing molecular weight, and improving the processability of the polymers produced.

In accordance with the present invention, aliphatic conjugated diene hydrocarbons, particularly the butadiene-1,3 hydrocarbons, are polymerized in a hydrocarbon diluent medium to form polymers of a high order of regular 1,4-structure and having low gel contents, no cross-linking and easier processability by the use of a *homogeneous catalyst* made by combining, as two essential ingredients, (1) a substantially anhydrous divalent cobalt salt and (2) an alkyl aluminum halide ingredient having the average composition $R_{1.1\ to\ 1.9}\ AlX_{1.9\ to\ 1.1}$. In such catalysts the principal catalyst-forming ingredients appear to be the cobalt salt and an $RAlX_2$ type ingredient, with greater or less proportions of an $R_2AlX$ type compound acting primarily as a modifier to reduce the gelling and tendency toward cross-linking. Such a catalyst is capable of driving the polymerization to completion in a reasonable time with the production of reaction mixtures of greater fluidity and containing polymers of lower gel content.

Further, these catalysts are truly homogeneous (i.e. do not contain macro or colloidal solids). Reaction between the catalyst ingredients does not appear to occur, even on prolonged standing. No reduction in the valence state of cobalt appears to occur. The ingredients can usually be dissolved in the hydrocarbon diluent medium or in one another and then added to the medium. The hydrocarbon-insoluble, inorganic cobalt salts can usually be dissolved in the monoalkyl aluminum dihalide or mixture of alkyl aluminum halides to produce a blue solution which is soluble in the hydrocarbon medium. These solutions are very active catalysts, polymerization therein seemingly occurring throughout the solution as one would expect of a truly soluble catalyst. These homogeneous catalysts have the important advantages of simplifying agitation and catalyst dispersion, less polymer build-up on reactor walls, and relatively easier catalyst removal and extraction in the polymer work-up procedures.

The homogeneous catalysts of this invention are carried in a hydrocarbon diluent medium containing any liquid hydrocarbon which is a solvent at least for the monomer including saturated aliphatic hydrocarbons from propane through pentane, hexane, heptane and higher boiling petroleum fractions such as "Debobase" (a hydrogenated kerosine fraction); aromatic hydrocarbons such as benzene, xylene, toluene, and others; and cycloaliphatics such as cyclohexane. It is preferred, however, to employ a solvent medium which includes at least about 15% by weight of an aromatic hydrocarbon such as benzene or xylene. The presence of the aromatic hydrocarbon produces somewhat faster reactions and a more easily processed polymer. Mixed butane or pentane/benzene solvents can be employed to advantage because of higher solids possible with the slurry-like products produced. Commercial supplies of the aromatic hydrocarbons are highly impure and should be treated with sulfuric acid and then distilled and dried before use.

The proportion or concentration of monomeric material in the reaction mixture can vary somewhat depending on the particular solvent or diluent medium employed. In most solvents in which both monomer and polymer are completely soluble, up to about 10% by weight of monomer, based on the total liquid mixture, can be present with the production of flowable, cement-like products. In other solvents in which the polymer is at least partially insoluble (i.e. butane or isobutane) whereby a slurry-like polymer mixture is obtained, a monomer concentration of up to about 20% can be employed.

The cobalt content of the catalysts of this invention can be supplied by any substantially anhydrous divalent cobalt salt. The salts may be of any non-oxidizing inorganic, organic, or inorganic-organic acid. Illustrative salts which have been found effective include cobalt-difluoride, cobalt dichloride, cobalt dibromide, cobalt diiodide, cobalt sulfate, cobalt phosphate, cobalt octyl phosphate (cobalt salt of octyl hydrogen phosphate), cobalt octoate, cobalt sorbate, cobalt adipate, cobalt-2-ethylhexoate, cobalt stearate, cobalt acetylacetonate, cobalt phthalate, cobalt naphthenate, cobalt tetrahydrophthalate, cobalt hexahydrophthalate, the cobaltous salt of a neopentyl-butadiene/maleic anhydride adduct, the cobaltous salt of polyacrylic acid, and many others. Preferred are the salts of organic acids because of their greater solubility in hydrocarbons, their much lower hygroscopicity and their considerable inertness in air. The inorganic cobalt salts generally have to be exhaustively dehydrated and then protected from the atmosphere before they will reliably form active catalysts. Even though highly insoluble in hydrocarbons, many inorganic acid cobalt salts can be dissolved in a monoalkyl aluminum dihalide to form clear solutions which form highly active catalysts. However, such mixtures are extremely sensitive to oxygen and are spontaneously, almost explosively, flammable in air. It is for the latter reason that the organic cobalt salts are preferred for these may be separately added. Moreover, there is an advantage in the separate addition of a dialkyl aluminum monohalide to the solvent and monomers (before adding the cobalt) since the latter compounds very efficiently scavenge the oxygen, peroxides, water, sulfur, and acetylenic impurities from the solvent and monomer. The latter procedure permits faster rates at lower total catalyst concentrations.

The alkyl aluminum halide ingredient can be added as a mixture of mono-and di-alkyl aluminum halide or as a mixture of any of $R_3Al$, $R_2AlX$, $RAlX_2$ or $AlX_3$ type compounds. On standing, the mixtures of these aluminum compounds equilibrate. For example, a mixture of $RAlX_2$ and $R_3Al$ equilibrate forming a mixture of $R_2AlX$ and $RAlX$ compounds. Similarly, an equimolar mixture of $AlX_3$ and $R_3Al$ equilibrate to form the "sesquihalide" having the composition $R_{1.5}AlX_{1.5}$. The technical mixtures formed by reacting an alkyl halide with metallic aluminum are of the latter type. Equilibration of a "sesquihalide" mixture within $AlX_3$ permits the production of mixtures in the range $R_{1.5 \text{ to } 1.9}AlX_{1.5 \text{ to } 1.1}$.

Any monoalkyl aluminum dihalide can be employed as a portion of catalyst ingredient (2) (see above). Illustrative compounds of this type include monomethyl aluminum difluoride, monoethyl aluminum difluoride, monopropyl aluminum difluoride, monoisobutyl aluminum difluoride, monooctyl aluminum difluoride, monolauryl aluminum difluoride, monomethyl aluminum dichloride, monoethyl aluminum dichloride, monoisobutyl aluminum dichloride, monomethyl aluminum dibromide, monoethyl aluminum dibromide, monoisobutyl aluminum dibromide, monomethyl aluminum diiodide, monoisobutyl aluminum diiodide, and many others.

The remainder of the aluminum portion of the catalyst may be any dialkyl aluminum halide including dimethyl aluminum fluoride, diethyl aluminum fluoride, dipropyl aluminum fluoride, diisobutyl aluminum fluoride, dioctyl aluminum fluoride, dimethyl aluminum chloride, diethyl aluminum chloride, diisobutyl aluminum chloride, dioctyl aluminum chloride, dimethyl aluminum bromide, diethyl aluminum bromide, diisobutyl aluminum bromide, dimethyl aluminum iodide, diisobutyl aluminum iodide, and many others.

The activity of the catalysts improve as the size of the alkyl group in the aluminum compound is reduced, in other words, the methyl aluminum halides are most active. Also, as one goes down in the halogen series (in the alkyl aluminum compound), the cis-1,4 directive activity seems to decrease in the order F→I. The same is true in the series of cobaltous halides.

In the homogeneous catalysts of this invention, the dialkyl aluminum halide constituent in the $$R_{1.1-1.9}AlX_{1.9 \text{ to } 1.1}$$

catalysts ingredient functions primarily as a modifier for as the proportion of this ingredient is increased a slight lowering of the polymer molecular weight can be noted as well as reduction in gel content. For this reason the ratio of the dihalide $RAlX_2$ constituent to monohalide ($R_2AlX$) can vary quite widely depending on the results desired, it being possible to maintain fluidity of the mixture with this ratio varying from as low as about 1:10 to as high as 10:1. Greatly preferred because of generally higher cis-1,4 contents in the polymers is the range from about 30 to about 80 mol percent of the dihalide and from about 20 to about 70 mol percent of the monohalide. Most preferred for use with certain organic acid cobalt salts are mixtures having the composition $$R_{1.4-1.7}AlX_{1.3-1.6}$$

The so-called "sesquihalide" mixtures containing approximately equimolar proportions of dihalide and monohalide generally are satisfactory for most uses and can be equilibrated with an aluminum trihalide, if desired, to adjust the chlorine: aluminum ratio at any desired value.

The proportions of the preceding paragraph relate to the relative proportions of the two types of aluminum compounds. The relative proportions of the cobalt and total aluminum (i.e. the mol ratio Co/Al) is not at all critical, at least as far as polymer structure is concerned. Thus, essentially all cis-1,4 polybutadienes (i.e. at least 85% cis-1,4) are obtained at Co/Al ratios from as low as 1:400 or lower, to as high as 2:1 or higher. In general, at a fixed cobalt level, the molecular weight of the polymer increases as the aluminum concentration increases. At fixed aluminum levels, the molecular weight increases as the cobalt concentration is decreased. At a fixed Co/Al ratio, the molecular weight increases as the total catalyst concentration decreases. It is preferred to operate in the range of Co/Al ratios between about 1:50 and 1:1 because the reactions are faster and more reliable.

As to the absolute catalyst concentration, it has been found that very little cobalt is required. With pure, dry solvents and monomers only trace amounts appear necessary. Usually, however, with commercial solvents and monomers at least about 0.0005 millimole (mM.) of cobalt for every 100 parts of butadiene (or about 0.001 mM. per liter of solvent) will be required. Up to about 5 or 10 mM. of cobalt per 100 grams of monomer can be employed, but since the higher concentrations seem to decrease the cis-1,4 content somewhat, it is preferred to utilize from about 0.001 to about 2 or 3 mM. of cobalt per 100 parts of monomer. The concentration of aluminum can also vary widely from as low as about 0.50 mM. to about 50 mM. or more per 100 parts of monomer. For general use, this means that less than about 2% by weight of total catalyst will be utilized.

The catalysts of this invention are insensitive to the order of mixing and they do not require "aging" or seasoning before use. For example, the cobalt salt and aluminum compounds can be pre-mixed or these ingredients can be added separately, in any order, to the reaction mixture. Solvent and/or monomer may be present during the addition of the catalyst. A more reliable procedure with questionable or variable solvents and monomers is to add at least a portion of the dialkyl aluminum monohalide ingredient to a mixture of the solvent and the monomer and agitate the mixture under an inert (dry, $O_2$-free) atmosphere to permit the dialkyl aluminum to scavenge impurities. The other two catalyst-forming ingredients can be combined and/or added separately as the last additions before carrying out the polymerization. In some cases, especially where the preferred procedure is not employed, there may be a short induction period but once having begun the polymerization proceeds throughout the mixture and at a vigorous rate until the monomer supply is exhausted. Agitation is beneficial because it improves heat transfer and the diffusion of residual monomer. By a suitable choice of catalyst proportions and catalyst ratio continuous polymerization procedures are possible.

Of course, the catalysts and reaction mixtures are prepared, and the polymerization reaction is carried out, taking precautions to exclude moisture and air (oxygen). While the three-component catalysts have considerable tolerance for water, the presence of oxygen usually leads to the production of a highly gelled and cross-linked product. The solvents and monomers usually should be redistilled before use. Exclusion of moisture and oxygen is most easily effected by maintaining an inert, dry atmosphere such as nitrogen, argon, helium, or hydrocarbon vapors over the liquid when preparing the reaction mixture and carrying out the polymerization.

The reaction temperature can vary somewhat, although for higher cis-1,4 polymers the lower temperatures are preferred. Temperatures of up to 50° C. can be employed. The lower limit on temperature seems to be dictated more by the freeze-point of the reaction medium than by catalyst activity. Temperatures as low as −35° C. have been employed. However, nearly as good results are obtained in the range from about −10° to about 30° C.

Following completion of the polymerization reaction, the reaction mixture is treated with a catalyst inactivator such as water, an alcohol, a carboxylic acid, acetone, an amine, and the like to destroy the catalyst and convert it to an oxygen-insensitive product. This step must be carried out in the absence of air in order to avoid oxidation of the polymer. The addition of excess dialkyl aluminum halide or trialkyl aluminum to the polymer-containing reaction mixture will protect against oxygen-induced gelation because these substances will take up the small quantities of oxygen inadvertently introduced. Cobalt compounds are well-known accelerators of oxidation so it is also best to add an antioxidant before, simultaneously with, or subsequent to, the addition of the catalyst killer. After this it is usually desirable to treat the reaction mixture with an extraction agent to remove the metal content. This may be carried out by water washes, alcohol washes, water-alcohol washes, and the like. Simultaneously, precipitation of the polymer may be brought about. For example, addition of alcohol or alcohol:solvent mixtures can be employed to kill the catalyst and precipitate the polymer as a solid crumb. The crumb-like precipitate can then be subjected to further washing with water and/or alcohol before it is treated to remove residual solvents. Azeotropic distillation of the slurry containing solvent and alcohol will very effectively remove residual solvent, extract catalyst and produce an easily-dried, alcohol-wetted crumb.

The three-component, homogeneous catalysts of this invention are useful in the polymerization of any aliphatic conjugated diene hydrocarbons including butadiene-1,3; isoprene; piperylene; 2,3-dimethyl-butadiene-1,3; pentadiene-1,3 (4-methyl-butadiene-1,3); 2-methyl-pentadiene-1,3; 2-methyl-hexadiene-1,3; 2-neopentyl-butadiene-1,3; 2-phenyl-butadiene-1,3 and many others. Preferred monomers are the butadiene-1,3 hydrocarbons having substituents only on the 2-carbon atoms including butadiene-1,3; isoprene (2-methyl-butadiene-1,3); 2-phenyl-butadiene-1,3; 2-neopentyl-butadiene-1,3; and others. Even more preferred are butadiene-1,3 hydrocarbons containing up to 5 carbon atoms and having as substituents, if any, a methyl group on the 2-carbon-atom (that is, butadiene-1,3 and isoprene). Most preferred is butadiene because it polymerizes most readily to the highest cis-1,4 content.

Example I

In this example, butadiene-1,3 is polymerized in benzene utilizing a three-component catalyst made up of (1) anhydrous $CoCl_2$ (made as in Example II); (2) isobutyl aluminum dichloride; and (3) diisobutyl aluminum monochloride. The benzene and butadiene (4.6% by weight butadiene, based on total solution) are combined in a dry glass bottle under a continuous flow of dry nitrogen, then 0.15% by weight, based on the monomers, of the diisobutyl aluminum chloride is added, followed by 0.53% by weight of a dark blue solution of anhydrous $CoCl_2$ in isobutyl aluminum dichloride. The latter solution is prepared by adding sufficient $CoCl_2$ to isobutyl aluminum dichloride as to yield a clear, supernatent layer analyzing as 6.52 millimoles (mM.) of cobalt plus aluminum per gram, of which 0.297 mM. per gram is cobalt. The reaction bottle is sealed and tumbled end over end in a 10° C. water bath for 3.4 hours. The bottle is then found to contain a viscous, flowable cement which is worked up by adding methanol (containing 1% antioxidant such as phenyl-beta-naphthylamine) so as to precipitate the polymer. The polymer is then extracted with several fresh portions of methanol and finally dried in a vacuum oven at 50° C. The percent conversion (monomer to polymer) is found to be 44% and its ash content to be 0.03%. The dry polymer is found, on infrared examination, to contain about 94% cis-1,4 structure, about 4% trans-1,4 and about 2% 1,2 structure.

The above polymer is compounded according to the following recipe:

| | Parts/wt. |
|---|---|
| Polymer | 100 |
| Stearic acid | 3 |
| "EPC" black | 40 |
| Zinc oxide | 5 |
| Ground sulfur | 2 |
| Mercapto-benzo-thiazyl disulfide | 1.75 |

After vulcanization for 30 minutes at 287° F. a smooth, tough, well-cured vulcanizate is obtained having the following properties:

| | 212° F.[1] ML10' | R.T. stress-strain | | | 212° stress-strain | | | Hysteresis ΔT° C. |
|---|---|---|---|---|---|---|---|---|
| | | 400% mod. | T. | E. | 400% mod. | T. | E. | |
| Example I | 123-128 | 1,500 | 4,200 | 690 | 800 | 1,650 | 670 | 36 |
| Natural Rx. (Hevea) | 62 | 2,200 | 3,700 | 520 | 950 | 1,900 | 650 | 28 |

[1] On raw polymer—Mooney viscosity at 212° F. after 10 minutes using the large 4 inch rotor.

The above properties of a high black recipe indicate outstanding utility for the high cis-1,4 polybutadiene as a carcass rubber in heavy duty truck and bus tires. The good hot strength and excellent hysteresis properties are much better than those of the butadiene/styrene copolymers known as "GR–S" or "SBR." Ordinary polybutadienes made in aqueous emulsion have only a fourth to one-half or less the tensile strength of the above high cis-1,4 polybutadiene, at room temperature, and virtually no strength at all at 212° F.

*Example II*

In this example, butadiene-1,3 is polymerized in benzene containing various catalysts made by combining isobutyl aluminum dichloride with anhydrous cobaltous chloride, both with and without varying amounts of diisobutyl aluminum chloride. The cobalt salt is dehydrated in an air oven at 130° C. to drive off the bulk of the water of crystallization, then cooled under dry $N_2$, dry xylene introduced, the resulting slurry distilled to drive off a xylene/water azeotrope (producing a slurry of anhydrous blue $CoCl_2$ solids), the xylene removed and the solid washed with benzine, the benzine removed and finally the solid heated under a vacuum to remove the final traces of the benzene. The resulting dry, anhydrous solid is dissolved in pure isobutyl aluminum di-chloride, 1.81 grams of the solid being added to 20 cc. of the aluminum compound and the deep blue colored supernatant layer removed. Upon analysis it is found to contain 0.226 millimole of cobalt per cc. (Al/Co ratio equal to 10.3).

The polymerization reactions are conducted in oven-dried one quart glass beverage bottles, charging to each 145 grams of dry benzene (less than 15 p.p.m. water) and 14 grams of re-distilled, dry commercial butadiene-1,3 followed by a measured volume of the blue cobalt/aluminum solution and a measured volume of diisobutyl aluminum chloride. The charging procedure is carried out under a continuous flow of dry nitrogen to exclude air and moisture. The small quantities of catalyst ingredients are added by calibrated hypodermic syringe. The charged bottles are then tumbled end over end in a rack which rotates in a 30° C. water bath. The reaction time is very short, varying from as little as 25 minutes to as much as 40 minutes. The data are summarized below:

| Sample No. | mM. $CoCl_2$/100 grms. but. | mM. $RAlCl_2$ total | mM. $R_2AlCl$ total | Ratio, $RAlCl_2:R_2AlCl$ | Observations |
|---|---|---|---|---|---|
| A | 4.00 | 1.8 | 0 | | Entire charge gelled. CA 100% conversion. |
| B | 4.00 | 1.8 | 0.065 | 28:1 | Do. |
| C | 4.00 | 1.8 | 0.13 | 14:1 | Do. |
| D | 4.00 | 1.8 | 0.26 | 7:1 | Flowable cement, 100% conversion. |
| E | 2.0 | 0.9 | 0.26 | 3.5:1 | Do. |
| F | 2.0 | 0.9 | 0.52 | 1.7:1 | Do. |
| G | 2.0 | 0.9 | 1.04 | 0.9:1 | Flowable cement, 89% conversion. |
| H | 1.07 | 0.48 | 1.04 | 1:2 | Flowable cement, 100% conversion. |
| I | 1.07 | 0.48 | 2.08 | 1:4.2 | Do. |
| J | 1.07 | 0.48 | 4.16 | 1:8 | Do. |
| K | 1.07 | 0.48 | 0 | | Completely gelled. CA 100% conversion. |

The above data shows that in each case, with $$RAlCl_2:R_2AlCl$$

ratios above about 10:1, the reaction mixture sets up to a very solid, tight mass of gel which could be removed from the bottle for work-up only by breaking the bottle. The solidified masses of gel are tediously soaked in alcohol to extract the benzene and catalyst. The benzene is successfully removed but high ash values indicate very poor catalyst extraction. The remaining cement-like charges are sufficiently flowable as to be removed from the bottle under nitrogen flow. Methanol, containing 1% by weight based on the polymer of phenyl-beta-naphthylamine antioxidant, is added to precipitate the polymer. The polymer is then drained and washed repeatedly with pure methanol and then dried in a vacuum oven at 50° C. The ash content of these samples is below 0.2%. Infrared examination of the resulting dried rubbers indicates that all of samples B through J are high cis-1,4 polybutadienes (i.e. 90% or better cis-1,4). Gelled samples A and K could not be worked up in a form convenient for sample preparation for infrared examination because of the highly insoluble nature thereof.

*Example III*

In this example, butadiene is polymerized in benzene using catalysts prepared from the approximately equimolar mixture of methyl aluminum dichloride and dimethyl aluminum chloride known as "methyl aluminum sesquichloride" and various organic cobalt salts. The polymerization is carried out in pre-dried bottles with ingredients being charged under a continuous flow of dry nitrogen and in the order: dry benzene, aluminum compound, butadiene (C·A·O 10% by weight) and cobalt salt. The charged bottles are rotated end over end in a water bath maintained either at 5° C. or 30° C. The data are summarized below:

| Sample No. | Cobalt salt | mM./l. | Al/Co ratio | Polymer temp., °C. | Time, hrs. | Percent conv. | Polymer structure | | |
|---|---|---|---|---|---|---|---|---|---|
| | | | | | | | Cis-1,4 | Trans-1,4 | 1,2 |
| A | Hexahydro-phthalate | 1.0 | 2.5:1 | 30 | 19 | 75 | 87 | 7 | 6 |
| B | 2-ethyl-hexoate | 0.12 | 16.2:1 | 30 | 16 | 100 | 88 | 7 | 5 |
| C | do | 0.12 | 32.4:1 | 30 | 16 | 100 | 91 | 6 | 3 |
| D | do | 0.03 | 117:1 | 30 | 20.3 | 100 | 90 | 5 | 5 |
| E | do | 0.028 | 159:2 | 5 | 16 | 100 | 90 | 6 | 4 |
| F | Naphthenate | 0.0457 | 73.2:1 | 30 | 0.5 | 100 | 87 | 8 | 5 |

In the above data several trends may be observed. First, as the Al/Co ratio increases, the proportion of cis-1,4 content increases. Also, as the Al/Co ratio increases, the polymerization rate increases. In addition, all the organic cobalt salts form active catalysts which produce high cis-1,4 polybutadienes. All of the polymers illustrated contained less than 5% gel (by the sol-gel procedure).

*Example IV*

Substantially similar experiments are carried out in benzene employing cobalt octoate as the source of cobalt and, as a source of aluminum compounds, either, (1) a mixture of methyl aluminum chloride having the approximate composition $Me_{1.66}AlCl_{1.33}$ or (2) a mixture of diisobutyl aluminum chloride and monoisobutyl aluminum dichloride. The data are as follows:

| Sample No. | Percent butadiene by weight | Catalyst Type | G./100 gms. butadiene | Temp., °C. | Reaction time | Percent conv. | Infrared Percent cis-1,4 | Percent trans-1,4 | Percent 1,2 | Percent gel | Mooney Ml. 10'–212° |
|---|---|---|---|---|---|---|---|---|---|---|---|
| A | 7.13 | Me$_{1.66}$AlCl$_{1.33}$ / Co-octoate | 0.804 / 0.0066 | 2–8 | 4 | 90 | 94 | 4 | 2 | 14 | 144 |
| B | 7.26 | Me$_{1.66}$AlCl$_{1.33}$ / Co-octoate | 0.786 / 0.0032 | 3–7 | 8 | 85 | 93 | 5 | 2 | 0 | 143 |
| C | 7.5 | i-bu$_2$AlCl / i-buAlCl$_2$ / Co-octoate | 1.03 / 0.404 / 0.0128 | 5 | 4 | 90 | 93 | 4 | 3 | <5 | — |

The above experiments, conducted on a larger scale, show that increased proportions of the mono-alkyl aluminum dihalide can be employed to moderate the reaction rate without sacrificing high conversion or high cis-1,4 content. Note that all three polybutadienes have low gel content.

*Example V*

In this example, butadiene-1,3 is polymerized in benzene using a blue catalyst solution similar to that of Example I. The benzene is purified by azeotropic distillation and then distilled from a dispersion of sodium metal. The butadiene utilized is "Phillips Special Grade" (essentially 100 mol percent butadiene) which is dried before use. In some experiments, the procedure is to charge (under N$_2$) first the benzene, then butadiene, followed by the blue catalyst solution and finally the diisobutyl aluminum chloride ingredient. In other experiments, the diisobutyl aluminum chloride ingredient is added to the benzene/butadiene mixture (10% monomer) and the blue CoCl$_2$/isobutyl aluminum dichloride solution added last. In every case, the product is a flowable cement which is worked up as in Example I. The data are as follows:

| Sample No. | mM. Co per 100 g. but. | mM. RAlCl$_2$ per 100 g. but. | mM. R$_2$AlCl per 100 g. but. | Ratio R$_2$AlCl: RAlCl$_2$ | Temp., °C. | Time, hrs. | Percent conv. | Percent gel | D.S.V.[1] | Percent cis-1,4 |
|---|---|---|---|---|---|---|---|---|---|---|
| A | 0.023 | 0.9 | 3.9 | 4:1 | 5 | 21 | 13 | <5 | 7.86 | 95 |
| B | 0.094 | 3.6 | 3.9 | 1:1 | 5 | 4.8 | 43 | 0 | 4.38 | 95 |
| C[2] | 0.023 | 0.9 | 3.9 | 4:1 | 5 | 3 | 43 | <5 | 3.85 | 93 |
| D[2] | 0.023 | 0.9 | 3.9 | 4:1 | 5 | 21 | 77 | <5 | 4.04 | 89 |

[1] Dilute solution viscosity.
[2] R$_2$AlCl added to benzene/butadiene mixture, blue cobalt solution added last.

It appears that markedly higher rates are achieved when the diisobutyl aluminum chloride is added to the monomers before adding the cobalt salt. It also appears that the aluminum monochloride reduced the amount of moisture, oxygen and other impurities present and also was effective in reducing gel content. The dilute solution viscosities (D.S.V.) of the polymers indicate that the molecular weights are high. The polymers are tough, dry and rubbery in nature.

When the control polymers of the above and other examples made with two-component catalysts (i.e. cobalt plus either RAlCl$_2$ or R$_2$AlCl are tested for Mooney viscosity, the Mooney curves are a broad band rather than a sharp line. This is interpreted as meaning that the rubber is more or less cross-linked. The polymers made with the three-component catalysts of the preceding examples exhibit sharp single-line Mooney viscosity curves. Subsequent investigation reveals that polymers made with cobalt catalysts may become cross-linked during processing, presumably due to the absorption of small amounts of oxygen. Consequently, the prompt incorporation of antioxidants and the rapid decomposition and efficient extraction of the catalyst is essential to the production of completely-soluble, soft and easily-processable products. Example VI will demonstrate these features.

*Example VI*

In this example, redistilled commercial butadiene is polymerized in dry, redistilled commercial coal-tar benzene utilizing the procedure of the preceding examples wherein the dry benzene and dry butadiene are combined in a dried reactor under a dry nitrogen atmosphere, 1.30 g./100 grams of butadiene of diisobutyl aluminum chloride added thereto and followed, after a short period of agitation to allow the aluminum compound to scavenge residual oxygen, moisture, and/or impurities, by the addition of sufficient of a blue catalyst solution to make 0.422 g./100 g. of butadiene of isobutyl aluminum dichloride and 0.0064 g./100 g. of monomer of cobalt (CoCl$_2$). In this case, the monomer concentration is 7.38% by wt., the reaction temperature is −1° to 6° C., the reaction time is 8 hours, and the conversion is 82%. One portion (A) of the resulting viscous, but flowable, cement is worked up by the procedure of the preceding examples wherein sufficient methanol containing 1% of diphenyl-para-phenylene diamine and 0.5% of dibeta-naphthyl-para-phenylene diamine, based on the weight of rubber, is added to precipitate the polymer, followed by methanol extractions and vacuum drying at 50° C. This sample contains about 0.2% ash and has a gel content of less than 5%. A second portion (B) of the same cement is worked up by the same procedure but omitting the antioxidant. This latter sample is found to contain 0.3% ash and has a gel content of 84%. Sample A is found to be a typical high cis-1,4 polybutadiene. Physical testing of vulcanized samples of the two rubbers (see Recipe, Ex. I) reveal the following:

ROOM TEMPERATURE

| Sample No. | 212° F. Ml. 10' | 400% mod. | Tensile | Percent elong. | 212° F. tensile | 212° F. elong. |
|---|---|---|---|---|---|---|
| A | 77 | 1,200 | 3,030 | 650 | 750 | 370 |
| B | 82 | | 350 | 210 | | |

It is obvious that great care either to exclude oxygen or to protect the polymer with antioxidant must be exercised during processing to obtain a satisfactory product.

Example VII

In this example aliphatic and cycloaliphatic hydrocarbons are employed as partial or complete replacements for the benzene utilized in the foregoing experiments utilizing catalysts prepared from a solution of anhydrous, solid $CoCl_2$ in "methyl aluminum sesquichloride" ($Me_3Al_2Cl_3$) containing about 0.09 mM. Co/gram and about 9.75 mM. aluminum/gram. The butadiene employed is "Phillips Special Purity" grade. The solvents are redistilled and dry. The monomer concentration varies between 60 and 80 grams per liter of solution. The other data are as follows:

| Sample No. | Catalyst, ml./100 g. BN | Solvent | Solvent ratio | BN conc., g./l. solv. | Temp., °C. | Time, hrs. | Percent conv. | Percent cis-1,4 | Polymer nature |
|---|---|---|---|---|---|---|---|---|---|
| A | 0.75 | Benzene | | 80 | 30 | 0.75 | 100 | 92 | Tough. |
| B | 0.75 | Benzene:xylene | 3:1 | 80 | 30 | 94 | 100 | 82 | Soft. |
| C | 0.75 | ____do____ | 1:1 | 80 | 30 | 94 | 37.5 | 75 | Semi-solid. |
| D | 0.75 | Xylene | | 80 | 20 | 94 | Trace | | |
| E | 0.50 | Heptane | | 60 | 30 | 90 | Trace | | |
| F | 0.50 | Cyclohexane | | 60 | 30 | 94 | 35.4 | 73 | Very viscous liquid. |
| G | 0.50 | Cyclohexane:benzene | 1:1 | 60 | 30 | 69 | 100 | 84 | Soft. |
| H | 0.50 | Pentane | | 60 | −5 | 139 | 50 | 86 | Soft, Sticky. |
| I | 0.70 | Pentane:benzene | 3:1 | 60 | −5 | 43 | 100 | 92 | Soft. |
| J | 0.50 | ____do____ | 1:1 | 60 | −5 | 43 | 100 | 94 | Tough. |
| K | 1.50 | Methylcylohexane | | 80 | 30 | 94 | 27.5 | 77 | Very viscous liquid. |

From the above data it is not clear whether the solvents utilized were impure or whether benzene forms a part of the catalyst system. It does show, however, that benzene is greatly preferred not only because the reaction rates are higher but also because the cis-1,4 content of the polymer always is higher when at least some benzene is present. Of the solvents tested, pentane appeared to have less effect on molecular weight and polymer structure (this may be due to the higher purity of the pentane). Similar results are obtained with mediums containing, or made up entirely of, other aromatic hydrocarbons such as toluene and xylene. Commercially-available toluene and xylene are so highly impure that their use without pretreatment generally results in lowered molecular weights. Purer forms of these hydrocarbons do not have this effect.

Example VIII

In this example, the duplicability of a three-component catalyst prepared by dissolving anhydrous $CoCl_2$ in methyl aluminum sesquichloride $(CH_3)_3Al_2Cl_3$, is tested by conducting a series of six consecutive identical experiments according to the procedure of the foregoing examples. The solvent is dry, redistilled commercial coal-tar benzene, Phillips Special Purity butadiene (dried over "molecular sieves"), the polymerization temperature is 30° C. and the reaction time 2 hours. The blue catalyst solution analyzes as 9.730 mM. of aluminum per gram and 0.0914 mM. of cobalt per gram. In each experiment the monomer concentration is 50 grams per liter of reaction mixture and the catalyst concentration is 0.4 ml. of the blue solution for every 100 grams of butadiene. The reaction in each case yields a viscous but flowable cement which is worked up with antioxidant as described in the foregoing examples. In every case a "dry" appearing, slightly tough rubber is obtained. Excellent duplication is achieved. The data are summarized below:

| Sample No. | Percent conv. | Polymer structure (infrared) | | | Percent gel | D.S.V. |
|---|---|---|---|---|---|---|
| | | Cis-1,4 | Trans-1,4 | 1,2 | | |
| A | 84 | 92 | 4 | 4 | 1 | 2.78 |
| B | 88 | 89 | 6 | 5 | 5 | 2.92 |
| C | 84 | 89 | 6 | 5 | 1 | 2.74 |
| D | 88 | 90 | 6 | 4 | 2 | 2.80 |
| E | 88 | 91 | 5 | 4 | 3 | 2.78 |
| F | 88 | 90 | 5 | 5 | 1 | 2.81 |

Example IX

In this example, isoprene is polymerized by the procedure of the foregoing examples employing a catalyst made by dissolving anhydrous $CoCl_2$ in methyl sesquichloride, the resulting blue supernatant layer being siphoned off and found on analysis to contain 9.663 mM./gm. of aluminum and 0.0517 mM./grm. of cobalt. The reaction mixture in each case is made by combining in a dry bottle under a continuous dry nitrogen flow 100 ml. of benzene, 6 ml. of dry isoprene, from 1 to 8 grams of thiophene, and from 0.06 to 0.12 ml. of the blue catalyst solution. The bottle is sealed and tumbled end over end in a 30° C. water bath to yield an essentially quantitative yield of soluble polymer in the form of viscous cement-like solutions. The latter are worked up by alcohol-precipitation in the presence of an antioxidant to yield a rubbery polyisoprene which is low in gel content. Infrared examination shows the latter to be high in cis-1,4 content (i.e., ca. 80%). Such polymer produces excellent vulcanizates useful as tire carcass rubbers.

Example X

In this example, very careful precautions are taken to exclude oxygen and moisture during the charging and polymerization steps in a polymerization of 14 grams of butadiene in 145 ml. of benzene utilizing as a catalyst a three-component catalyst prepared by combining methyl aluminum sesquichloride and $CoCl_2$ similar to those of the preceding examples. In this case, a flowable cement resulted. Several millimoles of triisobutyl aluminum are injected by hypodermic syringe into the sealed bottle just before beginning the work-up procedure. Sufficient methanol containing 1% by weight of an equal mixture of dibeta-naphthyl-paraphenylene diamine and diphenyl-para-phenylene diamine is added to kill the catalyst and precipitate the polymer. The resulting slurry is stirred, then filtered and the filter cake washed several times with fresh methanol. The alcohol-wetted crumbs are then dried in a vacuum oven at 50° C. The polymer is found to be a normal high cis-1,4 (i.e., over 90%) rubber which is soft and free of gel. The Mooney viscosity curve is a sharp line indicating freedom from cross-linking.

I claim:

1. The method which comprises polymerizing an aliphatic conjugated diene hydrocarbon in a hydrocarbon diluent medium, in the substantial absence of oxygen, at a temperature between −25 and 50° C. and in the presence of a catalyst dissolved in said hydrocarbon medium and including at least 0.001 gram millimole of cobalt per liter of said diluent, said catalyst being prepared by combining (1) a substantially anhydrous divalent cobalt salt (2) a mono-alkyl aluminum dihalide and (3) a dialkyl aluminum monohalide, the molar ratio of said mono-alkyl aluminum halide to said dialkyl aluminum halide being in the range of 1:10 to 10:1, and separating a solid polymer of said diene hydrocarbon containing not more than about 5% gel from the resulting polymerization mixture.

2. The method of claim 1 wherein the aliphatic conjugated diene is a butadiene-1,3 hydrocarbon containing up to 5 carbon atoms.

3. The method of claim 2 wherein the butadiene-1,3 hydrocarbon in butadiene-1,3 and the said polymer has a structure in which at least 85% of the butadiene-1,3 units are united cis-1,4.

4. The method of claim 1 wherein the hydrocarbon diluent medium contains at least 15% by weight of an aromatic hydrocarbon.

5. The method of claim 1 wherein the anhydrous cobalt salt is a cobaltous salt of an organic acid.

6. The method of claim 1 wherein the monoalkyl aluminum dichloride and the dialkyl aluminum monochloride are used in approximately equimolar amounts.

7. The method of claim 1 wherein the inert liquid hydrocarbon medium contains at least 15% by weight of an aromatic hydrocarbon.

8. The method of claim 7 wherein the aromatic hydrocarbon is benzene.

9. The method of claim 8 further characterized in that the alkyl groups in the monoalkyl aluminum dichloride and the dialkyl aluminum monochloride are methyl groups.

10. The method of preparing a processible rubbery cis-1,4 polybutadiene which comprises preparing a homogeneous solution containing monomeric butadiene-1,3, an anhydrous divalent cobalt salt, a monoalkyl aluminum dichloride and a dialkyl aluminum monochloride all dissolved in an inert liquid hydrocarbon medium which contains at least 15% by weight of an aromatic hydrocarbon, the molar ratio of monoalkyl aluminum dichloride to dialkyl aluminum monochloride being in the range indicated by the formula $R_{1.4-1.7}AlX_{1.3-1.6}$, wherein R is alkyl and X is halogen and the proportion of cobalt being at least 0.001 gram millimole per liter of said hydrocarbon medium; maintaining said solution at a temperature between $-25°$ and $50°$ C. and in the substantial absence of oxygen thereby to polymerize said butadiene-1,3 and produce a solution of rubbery cis-1,4 polybutadiene dissolved in said medium; adding an antioxidant to said solution and thereafter separating from said solution cis-1,4 polybutadiene in the form of a solid processible rubber of gel content not greater than about 5%.

References Cited in the file of this patent

UNITED STATES PATENTS

| | | |
|---|---|---|
| 2,781,410 | Ziegler et al. | Feb. 12, 1957 |
| 2,832,759 | Nowlin et al. | Apr. 29, 1958 |
| 2,846,427 | Findlay | Aug. 5, 1958 |
| 2,881,156 | Pilar et al. | Apr. 7, 1959 |
| 2,905,659 | Miller et al. | Sept. 22, 1959 |
| 2,910,461 | Nowlin et al. | Oct. 27, 1959 |
| 2,943,063 | Eby | June 28, 1960 |

FOREIGN PATENTS

| | | |
|---|---|---|
| 534,792 | Belgium | June 11, 1955 |
| 543,292 | Belgium | June 2, 1956 |
| 546,846 | Belgium | Oct. 7, 1956 |